April 20, 1948.  R. A. FOX  2,439,970
POLARIZED ARMATURE ELECTRICAL INSTRUMENT
Filed June 14, 1944
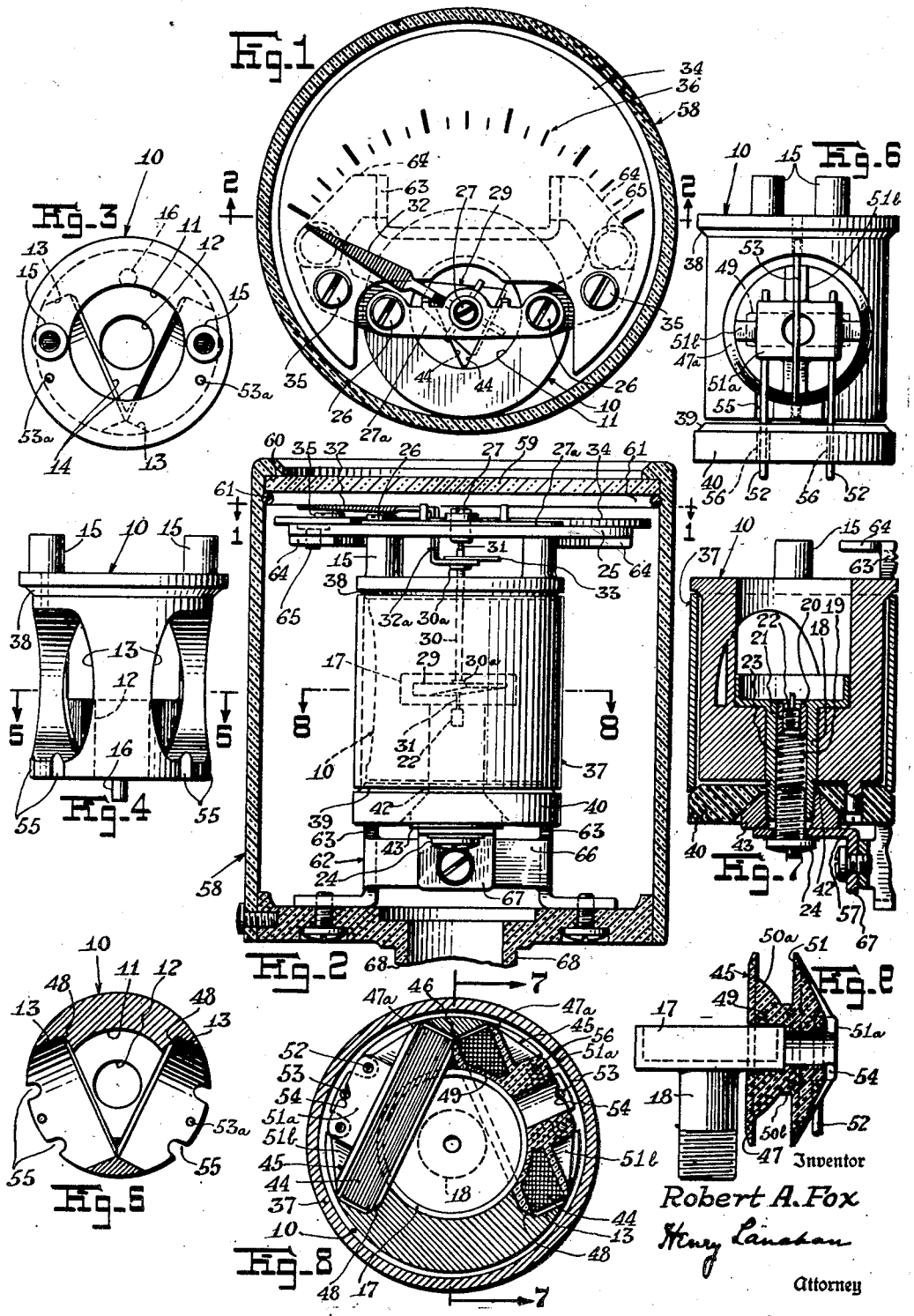
Inventor
Robert A. Fox
Henry Lanahan
Attorney Patented Apr. 20, 1948

2,439,970

UNITED STATES PATENT OFFICE 2,439,970

POLARIZED ARMATURE ELECTRICAL INSTRUMENT

Robert A. Fox, Glenview, Ill., assignor to Thomas A. Edison, Incorporated, West Orange, N. J., a corporation of New Jersey Application June 14, 1944, Serial No. 540,363

9 Claims. (Cl. 171—95)

This invention relates to electrical instruments and especially to improvements in the structural design of such instruments. The invention has especial reference to electrical instruments of the moving magnet type, and has been particularly applied to a ratiometer of the character described and claimed in a pending application of George H. Fritzinger, Serial No. 492,195, filed June 23, 1943—now abandoned and a continuation-in-part application Serial No. 569,083, filed December 20, 1944—and having a common assignee with the present invention, but it will be understood that no unnecessary limitation of my invention to such meter is intended.

It is an object of my invention to provide a structural design of electrical instrument of the moving magnet type which can be made inexpensively in production.

It is another object to provide a design of such instrument which comprises very few individual components that are easy to assemble.

It is another object to provide a design of electrical measuring instrument which can be made with a high degree of uniformity in production.

It is a further object to fulfill the aforestated object while realizing an instrument which is efficient in operation.

It is another object to provide a structural design of indicating instrument in which the pivots and jewels are safe-guarded against possible damage thereto in the assembling of the instrument.

More particularly, my invention has for further objects and features to provide a simple and effective means for accurately locating the magnetic shield in concentric relation to the pivot axis of the magnet; to provide a novel design of insulated spool for the field coils which permits maximum coil volume and enables the coils to be made uniformly and with less likelihood of shorted turns in production; to provide spools with terminals for the coils; to provide a design wherein the terminals are exposed in the assembled instrument to permit ready connection of lead wires thereto; to provide a spring attachment for holding the coils in position in the assembled instrument; and to utilize a component of the meter frame for anchoring the terminals of the coils so that tugging of the lead wires may not displace the coils from their mounted positions.

These and other objects and features of my invention will more fully appear from the following description and the appended claims.

In the description of my invention reference is had to the accompanying drawings, of which:

Figure 1 is an axial end view of a ratiometer embodying my invention, taken on the line 1—1 of Figure 2;

Figure 2 is an elevational view at right angles to the rotor axis showing the case in section on the diameter line 2—2 of Figure 1;

Figure 3 is an axial end view of the frame or housing per se for the meter;

Figure 4 is an elevational view of the meter frame;

Figure 5 is a sectional view of the meter frame taken on the line 5—5 of Figure 4;

Figure 6 is an elevational view of a subassembly of the meter showing a field coil in mounted position within the frame and a bottom centering disk for the magnetic shield;

Figure 7 is an axial sectional view of the assembled meter, less the rotor magnet and field coils, taken on the line 7—7 of Figure 8;

Figure 8 is a principally sectional view of a subassembly of the meter taken on the line 8—8 of Figure 2 through the centers of the field coils; and Figure 9 is a fractional view, partly in section, showing a spool for the field coils in mounted relation with the damping cup.

In the figures there is illustrated a ratiometer comprising two small field coils spaced from the pivot axis of the rotor magnet and a rotor magnet of non-symmetrical shape relative to its pivot axis. This arrangement of ratiometer—which is in accordance with the teaching of the Fritzinger application above-mentioned—has, among others, the advantages of enabling desired scale distributions to be obtained including a linear scale and of enabling the rotor magnet to be removed for repair and replacement of the pivots, as well as the jewel bearings, without disturbing the mounting of the field coils or of the magnetic shield. The present invention resides principally in providing an inexpensive and efficient design of such meter arrangement, but it is intended that the embodiment herein shown shall serve merely to illustrate the various features of my invention as these features have application to other electrical instruments, including sensitive meter relays, etc.

The construction of the ratiometer herein shown comprises a housing or frame 10 of generally cylindrical shape as appears in Figures 3 and 4. This frame consists preferably of a one-piece metal casting, made for example of aluminum, but may alternatively be molded of suitable plastic. The frame has a large axial bore 11 extending from the top (as it appears in Figure 3) through slightly more than half the length thereof, and has a smaller axial bore 12 continuing through its remaining length. In the sides of the frame there are two circular openings 13 at right angles to the longitudinal axis of the frame, which openings have flat bottom faces 14. These openings communicate with the bore 11 but do not intersect the smaller bore 12. At the top of the frame there are two integral standards 15 positioned on a diameter line through the axis of the frame, and at the bottom there is a depending post 16 for purposes hereinafter explained.

In the bottom portion of the bore 11 there is a cylindrical damping cup 17 made of highly conductive material such as copper. This cup has a depending tube 18 integral therewith that is press-fitted into the smaller bore 12 to locate the cup in concentric relation to the axis of the frame and to secure the cup fixedly thereto. The opening 19 in the tube 18 extends through the cup but terminates at the top in a beveled shoulder 20 as shown in Figure 7. Slidably fitting this opening is a sleeve 21 into which is threaded a jewel screw 22 comprising a suitable metal screw into which is set a V jewel made typically of glass or sapphire. The sleeve 21 has its upper end beveled to conform to the shoulder 20 and is spring-pressed against the shoulder—the shoulder serving as a stop—by a compression spring 23 which is interposed between the jewel screw and a screw 24 that is threaded into the lower end portion of the tube 18 of the damping cup.

At the top of the meter there is a bridge 25 mounted on the standards 15 and held thereto by screws 26. Midway between the standards and threaded through the bridge is a jewel screw 27. To frictionally hold the upper jewel screw in adjusted position, the jewel screw has threaded engagement with a strip 27a of spring material which is spaced at a small distance above the bridge where it threadingly engages the jewel screw but is clamped tightly against the bridge at its ends by the screws 26 so that an axial thrust pressure is exerted against the threads of the jewel screw.

Within the damping cup 17 there is a rotor magnet 29 made preferably of one of the permanent magnet materials having very high retentivity. This magnet is carried on a spindle 30 having pivots 31 at the ends which engage the jewel screws 22 and 27. The spindle is preferably made in one piece of a light material such as of aluminum and is provided with axial bores in the ends to receive the pivots 31 and with flanges 30a near the top and bottom thereof. The magnet 29 extends crosswise to the spindle 30 and is staked thereto against the bottom flange 30a. Similarly, a pointer 32 having the usual cross arm 33 is staked against the top flange 30a of the spindle. This pointer is offset at 32a to overlie a dial 34 held by screws 35 to the bridge 25. On the dial there is a scale 36 with which the pointer registers to indicate values in the condition being measured.

Surrounding the frame 10 is a tubular shield 37 of a non-permanent magnetic material such as of "Mumetal." With instruments of the pivoted magnet type, particularly with ratiometers, it is highly important that this magnetic shield be held accurately in concentric relation to the pivot axis of the magnet else the shield will impose a fixed magnetic bias on the magnet and error will be introduced with changing supply voltage. In the present invention, the shield is centered accurately by clamping it between two conical faces 38 and 39 of which each is concentric to the pivot axis of the magnet. The face 38 is formed on the frame 10 near the top thereof, while the face 39 is provided on a disk 40 at the bottom of the frame. This disk has a central opening 42 through which extends the tube 18 of the damping cup. The opening 42 is countersunk at the bottom, and threaded exteriorly onto the lower end portion of the tube 18 is a nut 43 having a beveled end face fitting the countersunk opening 42 for centering the disk 40 with the pivot axis of the magnet and clamping the disk to the frame of the meter. Under this clamping pressure the disk bears against the lower end of the shield to center the shield with the pivot axis of the meter, there being a clearance space between the inner face of the disk and the lower side of the frame as shown in Figure 7.

The radial openings 13 of the frame are provided to receive field coils 44, these coils serving to actuate the magnet to different angular positions according to the ratio of their currents. Each coil is wound on, and held to form by, a spool 45 made of insulating material. By way of example, the coils are located so that their magnetic axes are spaced 130° apart about the pivot axis of the meter as a center. In order that the maximum volume of coil may be realized for this spacing and for a given size of surrounding shield 37, the spools are mounted in V arrangement, they being contiguous with one another at the apex of the V as shown at 46 in Figure 8. The contiguous edges of the inner side walls of the spools have bevels 47 so as to permit further inward extending of the coils and the edges of the outer walls of the spools which are adjacent the shield 37 have similar bevels 47a to permit further outward extending of the coils so that a maximum width of coil may be realized for given dimensions of the meter components. Preferably, these bevels are extended around the entire spool, and on the end faces 14 of the openings 13 in the frame there are bevels 48 to provide a seat which will conform with the bevels 47 and positively localize the spools. Since the damping cup has cylindrical segmental portions projecting into the radial openings 13, the inner walls of the spools are provided with slots 49 of similar shape so as suitably to clear these projecting portions of the cup. The cores of the spools are circular in cross section so that the turns of the coils will be wound on circles and be without sharp bends. These features of avoiding sharp bends and of providing spools for holding the coils to form, so that adhesives—which in practice tend to attack the enamel of the wire—are not required, have the advantages of permitting the use of wire with minimum thickness of insulation without danger of encountering shorted turns and of thus increasing further the effective volume of the coil. In order that such core of circular cross section may be employed while yet to suitably clear the slot 39 and obtain maximum depth of winding space for the coils, the portion 50a of the core adjacent the inner wall of the spool has the shape of a spherical segment whereas the remaining portion 50b is cylindrical as shown. The outer wall 51 of the spool is reenforced within the space limitations of the surrounding shield 37 by providing it with a central outwardly-projecting portion 51a having extending ribs 51b as shown in Figure 6. Into the portion 51a there is molded a pair of relatively rigid wire terminals 52 for the coil, which terminals extend crosswise to the axis of the coil as shown in Figure 6.

In the assembled meter, the spools 45 are retained in place by suitable springs, such for example as spring wires 53 which are bowed inwardly to hook into recesses 53a in the top and bottom walls of the openings 13, there being a clearance slot 54 in the outer wall of each spool to receive this spring. As so assembled, the terminals extend downwardly through slots 55 in the walls of the openings 13 and through holes 56 in the disk 40. The holes 56 in the disk 40 are properly aligned with the terminals by engagement of the aforementioned post 16 of the frame within an opening 57 of the disk. The holes 56 are made just slightly larger in diameter than that of the wire terminals so that the terminals may not be so deflected sidewise in the handling of the instrument as to cause displacement of the field coils from their mounted positions. Also, to avoid the need for insulating the terminals from the disk 40 the latter is made of insulating material.

It will be observed that in the present invention the frame 10, damping cup 17 and shield 37 are localized in concentric relation with the pivot axis of the magnet and that this is done very accurately wholly by means of interengaging circular elements. For instance, the bore 12 and bevel 48 of the frame are made truly concentric as in the original casting of the frame or, if greater accuracy is desired, by finishing both of these surfaces with one setting of the frame in a suitable machine. Likewise, the damping cup 17, mounting sleeve 21 of the jewel screw 22, and disk 40, being each a cylindrically-shaped element, are permitted to be made with all portions in accurate concentric relation to each other. Since all of these elements interengage in concentric relation in the assembled meter, assurance is had that the surrounding shield 37 will be concentrically located with the bottom jewel 22 and therefore with the magnet 29, irrespective of absolute centering of the top jewel 27, since the magnet is mounted at the lower end of the spindle 30.

By way of example, the following specific dimensions have been used satisfactorily in the ratiometer above described: shield 37, inside diameter 1"; damping cup 17, thickness $\frac{3}{32}$", outside diameter $\frac{7}{8}$", height $\frac{3}{8}$"; spools 45, outside diameter .7", radius of spherical core segment 50a, .3", diameter of cylindrical core segment 50b, ¼", spacing between side walls 47 and 51, .150", and radius of bottom wall of slot 49, .281". These spools receive approximately 2000 turns of #39 single enameled wire.

It will be understood that since in sensitive meters the tips of the pivots have very small radii, it is required that the jewels be very carefully brought into engagement with the pivots in the assembly of the meter else inordinately high thrust pressures will be exerted against the pivots and the jewels to cause the tips of the pivots to be crushed and the jewels to be cracked. In the present invention, this risk of damage to the pivots and jewels in the assembling of the meter is avoided by yieldably mounting the bottom jewel 22 in the frame, this yieldable mounting being provided by the spring 23 acting against the slidably-supported sleeve 21 as hereinabove explained. With this feature of my invention, any threading of the jewel screws to bring excessive pressure against the pivots—such as is likely to occur if the pivots are not properly engaged with the jewel screws when the screws are screwed into position—is prevented from damaging the pivots and jewels since the spring 23 will yield to take up that excessive pressure.

As the rotor is deflected, the pole ends of the magnet pass through the core spaces of the field coils, the magnet being so oriented that the broad pole end thereof is directed toward the axes of the respective field coils when the pointer is at the ends of the scale as shown in Figure 1. The rotor may however be removed without disturbing the mounting of the coils or of the shield 37 by removing the bridge 25, turning the pointer 180° from a mid-scale position and then withdrawing the magnet through the V space between the coil spools. Also, the present meter construction has the feature that the jewels can be removed without disturbing the coils or the shield. For instance, to remove the bottom jewel it is only necessary to take out the screw 24, the nut 43 for holding the shield being permitted to be left in place. This latter feature is however claimed broadly in the pending Fritzinger application Serial No. 516,947, and having a common assignee with the present application.

The meter assembly above described is suitably mounted within a case 58 made as of insulating material and having a glass 59 at the top exposing the dial 34 and held against a shoulder 60 thereof by a ring clamp 61. The meter assembly is mounted onto the bottom wall of the case by a bracket 62 comprising two upstanding arms 63 having turned-over lugs 64 at the top held by screws 65 to the ends of the bridge 25. The arms 63 are bridged by an integral member 66 at the bottom to which is secured a small right-angle bracket 67 that is clamped to the bottom of the meter by the screw 43. At the center of the bottom wall of the case there is a depending tubular extension 68 adapted to receive one part of a pin and socket connector (not shown) for making lead connections to the meter.

While I have herein particularly described my invention in terms of a specific embodiment thereof, this embodiment is illustrative and not necessarily limitative of my invention and is subject to changes and modifications within the range of engineering skill without departure from the scope of my invention, which I endeavor to express in my specification.

I claim:

1. In an electrical instrument including a pivoted permanent magnet and means for generating a magnetic field to produce a torque influence on said magnet: the combination of a frame to which said magnet is pivoted; a surrounding sleeve of magnetic material for shielding said instrument; and means for locating said sleeve in concentric relation to the pivot axis of said magnet, comprising a conical surface on said frame concentric to said pivot axis and forming a seat for one end of said sleeve, a clamping member on said frame having a conical surface forming a seat for the other end of said sleeve, and means localizing said clamping member in concentric relation to the pivot axis of said magnet.

2. In an electrical instrument including a pivoted permanent magnet, a field coil for producing a torque-influencing field on said magnet and a cylindrical magnetic shield surrounding said magnet: the combination of a cylindrical frame member having a central hole within which said magnet is pivotally supported, and a side opening; a damping member in said hole for said magnet and having a portion projecting into said side opening; and a spool of insulating material for said field coil, said spool being shaped to fit said side opening and having a slot therein receiving said projecting portion of the damping member.

3. In an electrical instrument having a pivoted permanent magnet, a cylindrical damping cup surrounding said magnet and a field coil at least substantially parallel to the pivot axis of said magnet for producing a magnetic field to influence said magnet: a spool of insulating material for said field coil having a slot in one side wall thereof for receiving a portion of said damping cup, said slot having the shape of a cylindrical segment so that said spool will conform with said portion of the damping cup, and said spool having a core circular in cross section, at least a portion of said core adjacent said one side wall having the shape of a spherical segment.

4. In an electrical instrument having a pivoted permanent magnet, a damping member for said magnet and a field coil substantially parallel to the pivot axis of said magnet for producing a magnetic field to influence said magnet: a spool of insulating material for said field coil having a slot in one side wall thereof for receiving a portion of said damping member, and said spool having a pair of terminals for said field coil, said terminals being molded into the other side wall of the spool and being crosswise to the axis of the spool.

5. In an electrical instrument having a pivoted permanent magnet, a cylindrical damping cup surrounding said magnet, a cylindrical magnetic shield surrounding said damping cup in spaced relation thereto and concentric with the pivot axis of said magnet, and a field coil mounted between said damping cup and said shield: a spool of insulating material for said field coil, said spool having a slot in the inner side wall thereof for receiving a portion of said damping cup when the spool is in mounted position, the outer side wall of said spool having opposite diametrical edges lying adjacent to the inner wall surface of said shield in said mounted position of the spool, and the central portion of said outer side wall being augmented in thickness to reenforce the wall, said central portion lying within an arc described from said diametrical edges of the spool about the pivot axis of the magnet as a center.

6. In an electrical instrument having a pivoted permanent magnet, a cylindrical damping cup surrounding said magnet, a cylindrical magnetic shield surrounding said damping cup in spaced relation thereto and concentric with the pivot axis of said magnet, and a field coil mounted between said damping cup and said shield: a spool of insulating material for said field coil, said spool having a slot of the shape of a cylindrical segment in the inner side wall thereof for receiving a portion of said damping cup when the spool is in mounted position, at least the portion of the core of said spool adjacent said inner wall having the shape of the segment of a sphere, and the outer wall of said spool having a portion augmented in thickness for reenforcing the wall, said portion lying, when the coil is in mounted position, within an arc described about the pivot axis of the magnet at clearing distance from the inner surface of said shield.

7. In an electrical instrument including a pivoted permanent magnet and means for generating a magnetic field to produce a torque influence on said magnet: the combination of a cylindrical magnetic shield surrounding said magnet; and means for locating said shield in concentric relation to the pivot axis of said magnet, comprising separate seating members for the respective end portions of said shield having shield-localizing surfaces concentric to the pivot axis of said magnet, at least one of said surfaces being conical, and means for exerting pressure on one of said seating members along said pivot axis relative to the other seating member whereby to clamp the seating members against the end portions of said shield.

8. In an electrical instrument including a pivoted permanent magnet, a field coil for producing a torque-influencing field on said magnet and a cylindrical magnetic shield surrounding said magnet: the combination of a hollow frame member within which said magnet is pivotally supported, having a side opening; a damping member within said frame member surrounding said magnet and having a portion projecting into said side opening; and a spool for said field coil in said side opening and having a localizing slot therein received by the projecting portion of said damping member.

9. In an electrical instrument including a pivoted permanent magnet and a surrounding tubular shield: the combination of a frame member having a central hole therein; a damping member for said magnet having a projecting central portion fitting said hole; a member at an end of said frame for localizing said shield with respect to the pivot axis of said magnet, said localizing member having a central opening adapted to be aligned with the central portion of said damping member; and means connected to said central portion and engaging said opening for centering said localizing member at the pivot axis of said magnet.

ROBERT A. FOX.

REFERENCES CITED

The following references are of record in the file of this patent:

UNITED STATES PATENTS

| Number | Name | Date |
| --- | --- | --- |
| 733,611 | Alton | July 14, 1903 |
| 780,770 | Wood | Jan. 24, 1905 |
| 1,984,036 | Schwartzmann | Dec. 11, 1934 |
| 2,339,021 | Lingel | Jan. 11, 1944 |
| 2,354,618 | Sias | July 25, 1944 |
| 2,358,910 | De Giers | Sept. 26, 1944 |